US008769347B2

(12) United States Patent
Fresson et al.

(10) Patent No.: US 8,769,347 B2
(45) Date of Patent: Jul. 1, 2014

(54) APPARATUS AND METHOD FOR MONITORING A COMPUTER SYSTEM

(75) Inventors: Paul Fresson, Romsey (GB); Simon P. Knights, Southhampton (GB); Russell Wilson, Uffculme (GB)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 13/143,452

(22) PCT Filed: May 13, 2010

(86) PCT No.: PCT/EP2010/056622
§ 371 (c)(1),
(2), (4) Date: Jul. 6, 2011

(87) PCT Pub. No.: WO2010/133507
PCT Pub. Date: Nov. 25, 2010

(65) Prior Publication Data
US 2011/0276840 A1 Nov. 10, 2011

(30) Foreign Application Priority Data
May 22, 2009 (EP) .................................... 09160920

(51) Int. Cl.
G06F 11/30 (2006.01)
(52) U.S. Cl.
USPC ............................... 714/47.2; 714/25; 714/57
(58) Field of Classification Search
USPC .......................................... 714/25, 47.2, 57
See application file for complete search history.

(56) References Cited

U.S. PATENT DOCUMENTS

| 5,689,636 A | 11/1997 | Kleber et al. |
| 6,026,440 A | 2/2000 | Shrader et al. |
| 8,468,535 B1* | 6/2013 | Keagy et al. .................. 718/104 |
| 2004/0210555 A1* | 10/2004 | Naimark et al. .................. 707/1 |
| 2005/0091363 A1* | 4/2005 | McCormick et al. ......... 709/224 |

(Continued)

FOREIGN PATENT DOCUMENTS

| EP | 2003263342 | 9/2003 |
| EP | 2005004336 | 1/2005 |

(Continued)

OTHER PUBLICATIONS

International Search Report & Written Opinion, Aug. 4, 2010, for International Application No. PCT/EP2010/056622, Total 10 pp.

(Continued)

*Primary Examiner* — Chae Ko
(74) *Attorney, Agent, or Firm* — Janaki K. Davda; Konrad, Raynes, Davda & Victor LLP

(57) ABSTRACT

An apparatus and method for monitoring a computer system operable for alerting an operator to failures associated with critical resource consumption and comprises: a resource monitoring component for monitoring resource consumption; a threshold setting component for setting a threshold of resource consumption between an average resource consumption value and a critical resource consumption value; a diagnostic data collection component; and a threshold crossing detection component; wherein the diagnostic data collection component is operable, in response to the threshold crossing detection component detecting a threshold crossing, to start or stop diagnostic data collection.

18 Claims, 3 Drawing Sheets

(56) References Cited

U.S. PATENT DOCUMENTS

| | | | |
|---|---|---|---|
| 2007/0294593 A1 | 12/2007 | Haller et al. | |
| 2008/0062890 A1* | 3/2008 | Temple | 370/254 |
| 2008/0097801 A1* | 4/2008 | MacLellan et al. | 705/7 |
| 2008/0104247 A1* | 5/2008 | Venkatakrishnan et al. | 709/226 |
| 2008/0133749 A1* | 6/2008 | Sample | 709/224 |
| 2008/0140448 A1* | 6/2008 | Hernandez et al. | 705/2 |
| 2008/0155623 A1* | 6/2008 | Ota | 725/109 |
| 2008/0244061 A1* | 10/2008 | Kime | 709/224 |
| 2009/0070457 A1* | 3/2009 | McKinney | 709/224 |
| 2009/0193121 A1* | 7/2009 | Shin | 709/225 |
| 2010/0268816 A1* | 10/2010 | Tarui et al. | 709/224 |
| 2011/0270795 A1* | 11/2011 | Smith et al. | 706/52 |
| 2012/0124363 A1* | 5/2012 | Dietrich et al. | 713/100 |

FOREIGN PATENT DOCUMENTS

| | | |
|---|---|---|
| EP | 2008193136 | 8/2008 |
| JP | H07152611 | 6/1995 |
| JP | 201134473 | 5/2001 |
| JP | 2003263342 A | 9/2003 |
| JP | 2005004336 A | 1/2005 |
| JP | 2008193136 A | 8/2008 |
| JP | 2008537610 | 9/2008 |
| WO | 2010056622 A1 | 5/2010 |

OTHER PUBLICATIONS

English Abstract for EP2003263342, published Sep. 19, 2003, Total 1 p.

English Abstract for EP2005004336, published Jan. 6, 2005, Total 1 p.

English Abstract for EP2008193136, published Aug. 21, 2008, Total 1 page.

English Abstract and Machine Translation for JP2005004336A, published Jan. 6, 2005, Total 23 pp.

English Abstract and Machine Translation for JP2008193136A, published Aug. 21, 2008, Total 29 pp.

English Abstract and Machine Translation for JP2003263342A, published Sep. 19, 2003, Total 33 pp.

International Preliminary Report, Nov. 22, 2011, for International Application No. PCT/EP2010/056622, Total 6 pp.

EP Communication, Apr. 4, 2012, for UK Application No. GB10720410.9-1225, Total 9 pp.

US Patent No. 5,689,636, dated Nov. 18, 1997, is an English language equivalent of JPH07152611, dated Jun. 16, 1995.

US Publication No. 2008/0097801, dated Apr. 24, 2008, is an English language equivalent of JP2008537610, dated Sep. 18, 2008.

Information Materials for IDS form created Dec. 6, 2013, from JP Office Action, dated Nov. 19, 2013, 2 pp.

* cited by examiner

APPARATUS AND METHOD FOR MONITORING A COMPUTER SYSTEM

FIELD OF THE INVENTION

The present invention relates to the field of monitoring computer systems and more specifically to an automated apparatus and method for causing the provision of appropriate historical diagnostic data when an operator alert is driven.

BACKGROUND OF THE INVENTION

Monitoring applications can be configured to alert an end-user when a certain monitored resource exceeds or drops below a pre-defined threshold. These thresholds are typically determined by observing the use of the system for a period of time. The implications of this approach are:

1. It is impractical to expect frequent manual intervention by an administrator on long running or complex systems. Therefore alerts are not driven frequently and are typically only driven when a critical system failure occurs.

2. Due to performance or storage constraints the gathering of diagnostic information does not occur continually. When an alert is triggered there is frequently very little historical diagnostic information available.

This leads to the following problems:

1. A lack of historical diagnostic data makes problem diagnosis difficult, so the operator does not know what actions to take to resolve the problem.

2. The systems administrator tends to react to problems after they occur rather than identify potential problems in advance.

The applicant thus believes that it is desirable to have an automated apparatus and method for causing the provision of appropriate historical diagnostic data when an operator alert is driven.

SUMMARY OF THE INVENTION

The present invention accordingly provides, in a first aspect, an apparatus for monitoring a computer system operable for alerting an operator to failures associated with critical resource consumption and comprising: a resource monitoring component for monitoring resource consumption; a threshold setting component for setting a threshold of resource consumption between an average resource consumption value and a critical resource consumption value; a diagnostic data collection component; and a threshold crossing detection component; wherein said diagnostic data collection component is operable, in response to said threshold crossing detection component detecting a threshold crossing from a resource consumption value below said threshold to a resource consumption value above said threshold, to start diagnostic data collection.

Preferably, said diagnostic data collection component is operable, in response to said threshold crossing detection component detecting a threshold crossing from a resource consumption value above said threshold to a resource consumption value below said threshold, to stop diagnostic data collection.

Preferably, the apparatus further comprises a diagnostic data storage component operable to store diagnostic data.

The apparatus may further comprise a diagnostic data purging component operable to purge said diagnostic data responsive to said threshold crossing detection component detecting said threshold crossing from a resource consumption value above said threshold to a resource consumption value below said threshold and causing said diagnostic data collection component to stop diagnostic data collection.

Preferably, said threshold setting component further comprises a rules engine for determining said threshold of resource consumption between said average resource consumption value and said critical resource consumption value.

Preferably, said rules engine is operable to accept a plurality of inputs from said resource monitoring component and apply a probability-based rule thereto.

Preferably, said threshold setting component is operable to set a plurality of thresholds each associated with a level of diagnostic data collection, and wherein said diagnostic data collection component is operable to start and stop diagnostic data collection for each said level.

The present invention further provides a method for monitoring a computer system operable for alerting an operator to failures associated with critical resource consumption and comprising the steps of: monitoring, by a resource monitoring component, resource consumption; setting, by a threshold setting component, a threshold of resource consumption between an average resource consumption value and a critical resource consumption value; detecting, by a threshold crossing detection component, a threshold crossing from a resource consumption value below said threshold to a resource consumption value above said threshold; responsive to said step of detecting, starting diagnostic data collection by a diagnostic data collection component.

Preferably, in response to said threshold crossing detection component detecting a threshold crossing from a resource consumption value above said threshold to a resource consumption value below said threshold, diagnostic data collection by said diagnostic data collection component is stopped.

The method may further comprise storing diagnostic data.

The method may further comprise purging said diagnostic data responsive to said threshold crossing detection component detecting said threshold crossing from a resource consumption value above said threshold to a resource consumption value below said threshold and causing said diagnostic data collection component to stop diagnostic data collection.

The method may further comprise determining by a rules engine said threshold of resource consumption between said average resource consumption value and said critical resource consumption value.

Preferably, said rules engine is operable to accept a plurality of inputs from said resource monitoring component and apply a probability-based rule thereto.

The method may further comprise setting a plurality of thresholds each associated with a level of diagnostic data collection, and wherein said diagnostic data collection component is operable to start and stop diagnostic data collection for each said level.

In a third aspect, there is provided a computer program comprising computer program code to, when loaded into a computer system and executed thereon, cause said computer system to perform the steps of a method according to the second aspect.

Preferred embodiments of the present invention thus advantageously provide an automated apparatus and method for causing the provision of appropriate historical diagnostic data when an operator alert is driven.

In embodiments of the present invention, there is provided an automated system for providing historical diagnostic information when an operator alert is driven. A predetermined threshold between an average level for a resource and a critical point is set, and when this threshold is reached the application automatically activates its diagnostic collection facility, leaving collection active until the monitored resource drops below the threshold for collection. If a failure alert is driven, there will be diagnostic information from the initial time that the monitored resource hit the diagnostic threshold through to the point of failure for offline analysis. By only triggering the diagnostic collection when a problem may be imminent, the performance/storage impact is lessened.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
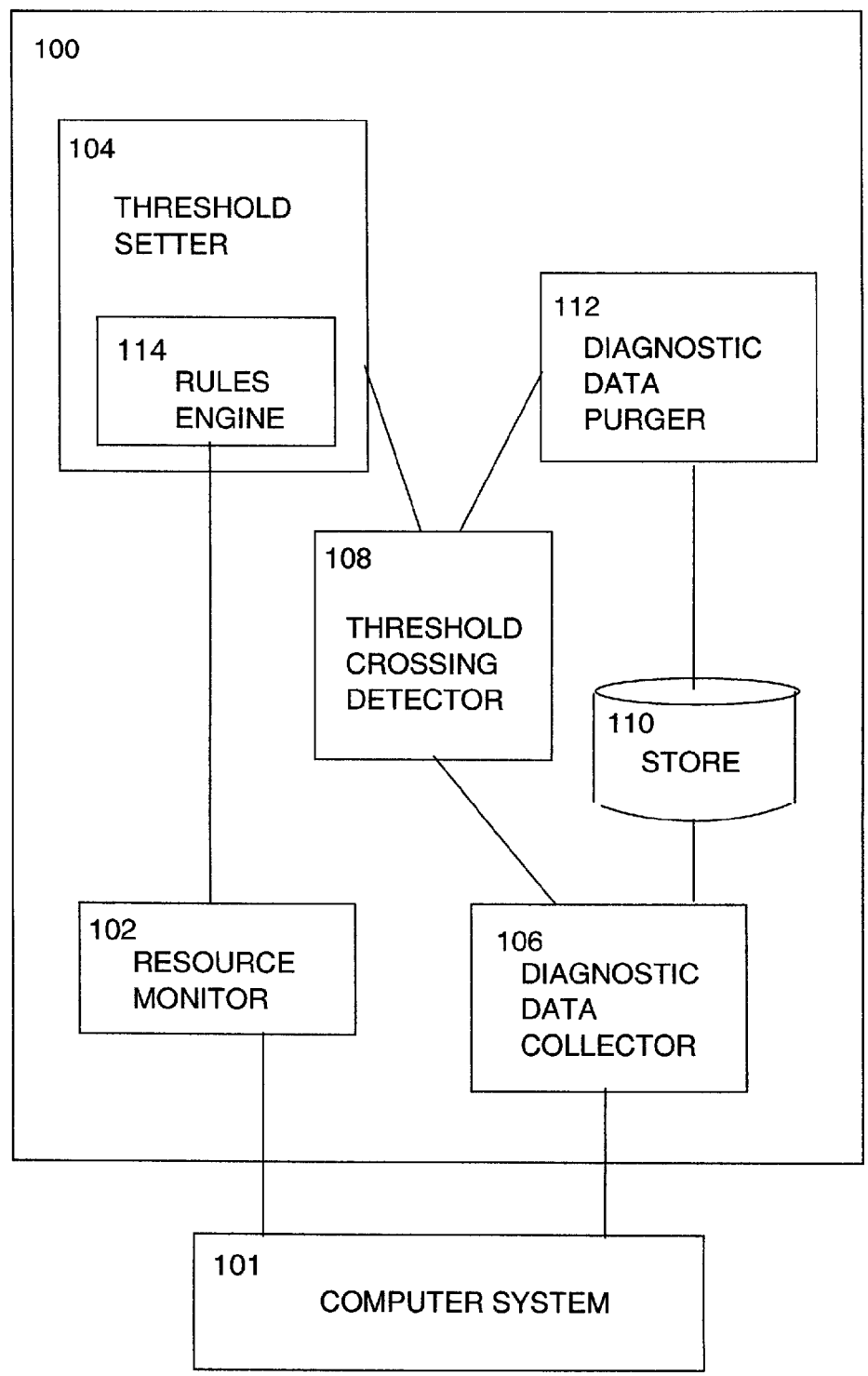
FIG. 1 shows, in simplified schematic form, an apparatus according to one embodiment of the present invention.

Referring now to FIG. 1, there is shown an apparatus 100 for monitoring a computer system 101, typically one having a facility for alerting an operator to failures associated with critical resource consumption. Apparatus 100 comprises a resource monitoring component 102 for monitoring resource consumption and a threshold setting component 104 for setting a threshold of resource consumption between an average resource consumption value and a critical resource consumption value. Apparatus 100 further comprises a diagnostic data collection component 106 and a threshold crossing detection component 108. Diagnostic data collection component 106 is operable, in response to threshold crossing detection component 108 detecting a threshold crossing from a lower resource consumption value to a higher resource consumption value, to start diagnostic data collection.

Additionally, diagnostic data collection component 106 is operable, in response to threshold crossing detection component 108 detecting a threshold crossing from a higher resource consumption value to a lower resource consumption value, to stop diagnostic data collection. Apparatus 100 further comprises diagnostic data storage component 110 operable to store diagnostic data and diagnostic data purging component 112 operable to purge the stored diagnostic data responsive to the threshold crossing detection component 108 detecting a threshold crossing from a higher resource consumption value to a lower resource consumption value and causing diagnostic data collection component 106 to stop diagnostic data collection.

Threshold setting component 104 comprises a rules engine 114 for determining the threshold of resource consumption between the average resource consumption value and the critical resource consumption value. Rules engine 114 is operable to accept a plurality of inputs from resource monitoring component 102 and apply a probability-based rule thereto. The probability-based rules may comprise mean-and-deviation based rules, Gaussian distribution based rules, Poisson distribution based rules, or the like.

Figure 2:
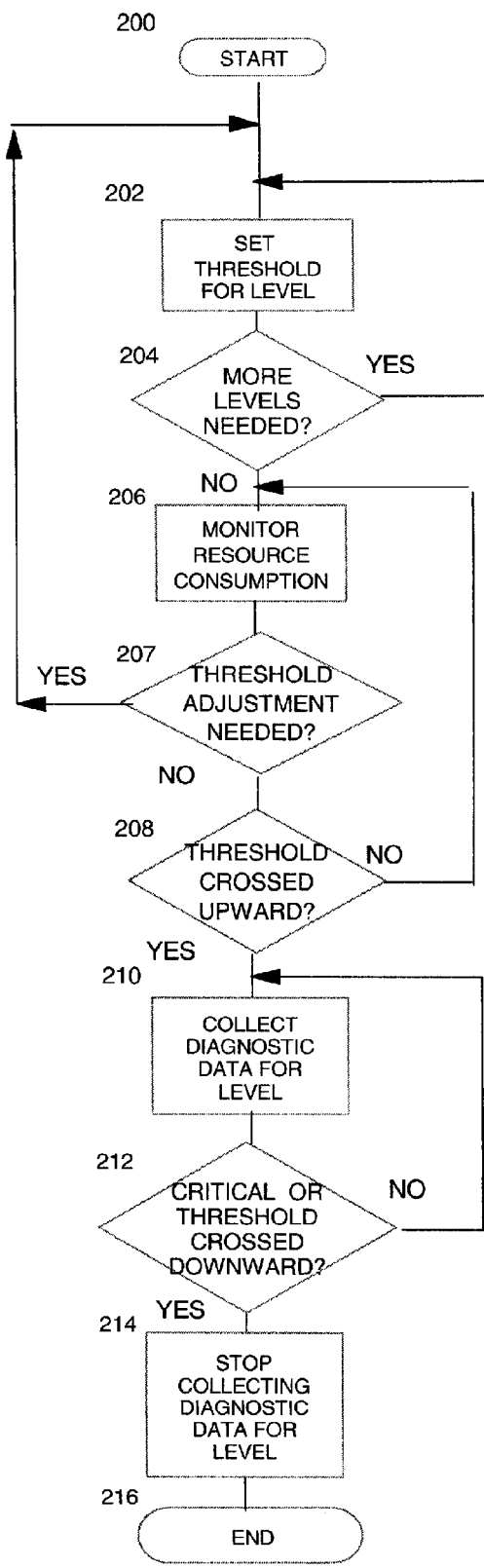
FIG. 2 shows, in flowchart form, a method according to one embodiment of the present invention.

Referring now to FIG. 2, there is shown in flowchart form a method or logic process for monitoring a computer system operable for alerting an operator to failures associated with critical resource consumption. At start step 200 the process begins, and at step 202 a threshold is set. This may be a threshold for a particular level of diagnostic data collection, or it may be a single threshold. Test step 204 determines if more levels are needed. If the outcome is positive, the process repeats step 202 and test step 204. If the outcome is negative, the process continues. At step 206, monitoring of resource consumption begins and the system proceeds with normal running. Test step 207 determines from one or more inputs from the monitoring of resource consumption whether a threshold needs to be set to a different value. If the outcome is positive, the process returns to set the threshold at step 202. If not, the system continues with normal running. Test step 208 tests for an indication that the threshold value of resource consumption has been crossed upward from a lower value to a higher value. If not, steps 206 and 208 continue as a repeating loop. If the outcome of test step 208 shows that the threshold value of resource consumption has been crossed upward, at step 210 collection of diagnostic data for the appropriate level is begun and continues until test step 212 indicates that the critical level has been reached or the threshold has been crossed downward. At step 214 the process stops collection of diagnostic data for the level. This might be the only level in a single-threshold system, or it might be a particular level of data collection set according to the proximity of the resource consumption value to the critical value. At step 216, the process according to a preferred embodiment of the invention completes.

Embodiments of the invention thus provide an automated system and method for determining when a problem is likely to occur and activating diagnostic data gathering prior to the operator alert being driven.

A preferred embodiment of the invention calculates an average level for a resource and uses the fact that alerts are typically configured to occur when the resource exceeds or drops below a critical point. At a pre-determined threshold between the average and the critical point, the application automatically activates its diagnostic collection facility, leaving it active until the monitored resource drops below/above the threshold for collection. If the failure alert is not driven, the diagnostic data is either archived or deleted. If the failure alert is driven, there will be diagnostic information from the initial time that the monitored resource hit the diagnostic threshold through to the point of failure for offline analysis. By only triggering the diagnostic collection when a problem may be imminent, the performance/storage impact is lessened.

Advantageously, relevant diagnostic information is available to the administrator when the alert occurs and the time that the system has performance intensive debugging options active is minimized. There is no configuration or manual interaction necessary by the operator to activate gathering of diagnostic information because it is activated automatically by the system prior to the operator alert being driven.

Additional advantages of the preferred embodiment are that:

1. It uses statistical methods for determining when to switch on gathering of diagnostic information; and 2. When the administrator configures an operator alert, the system may further configure a secondary 'weak' alert to activate diagnostic information.

The preferred embodiment works by selecting a "trigger" threshold for diagnostic collection. This trigger threshold will lie somewhere between the "average" and the "critical" levels for any monitored resource. Upon hitting the diagnostic trigger, diagnostic collection activates and remains so until the value drops above/below the threshold again.

The method of automatically choosing a trigger threshold makes use of statistical techniques that allow the probability that a range of values will occur to be estimated when the average and standard deviation are known. The system sets the trigger to a value which has a slightly higher probability of occurring than the operator alert. This produces an optimal trigger value which is unlikely to be driven unless the user alert is about to be driven. In addition it means that an end user can be given an estimation of how often user alerts will be driven and how often the debug gathering will be active on a running system. Merely adding or subtracting a set value to the user value and using that as a trigger would be inefficient because the size of the delta between the trigger and user alert depends on the spread of values on the monitored resource.

Several statistical methods of estimating the probability values exist. The methods vary in complexity. The simplest method subtracts a fraction of the standard deviation from the user alert value if the mean is less than the trigger. It adds a fraction of the standard deviation from the user alert if the mean is higher than the trigger. This is the simplest, and least computationally expensive, option and fits a wide range of data. Other methods include applying the formulas for Gaussian/Normal distributions or Poisson distributions to explicitly calculate the probability of the trigger value occurring increasing the probability by a small amount and applying the inverse of the equations to calculate the trigger value.

Figure 3:
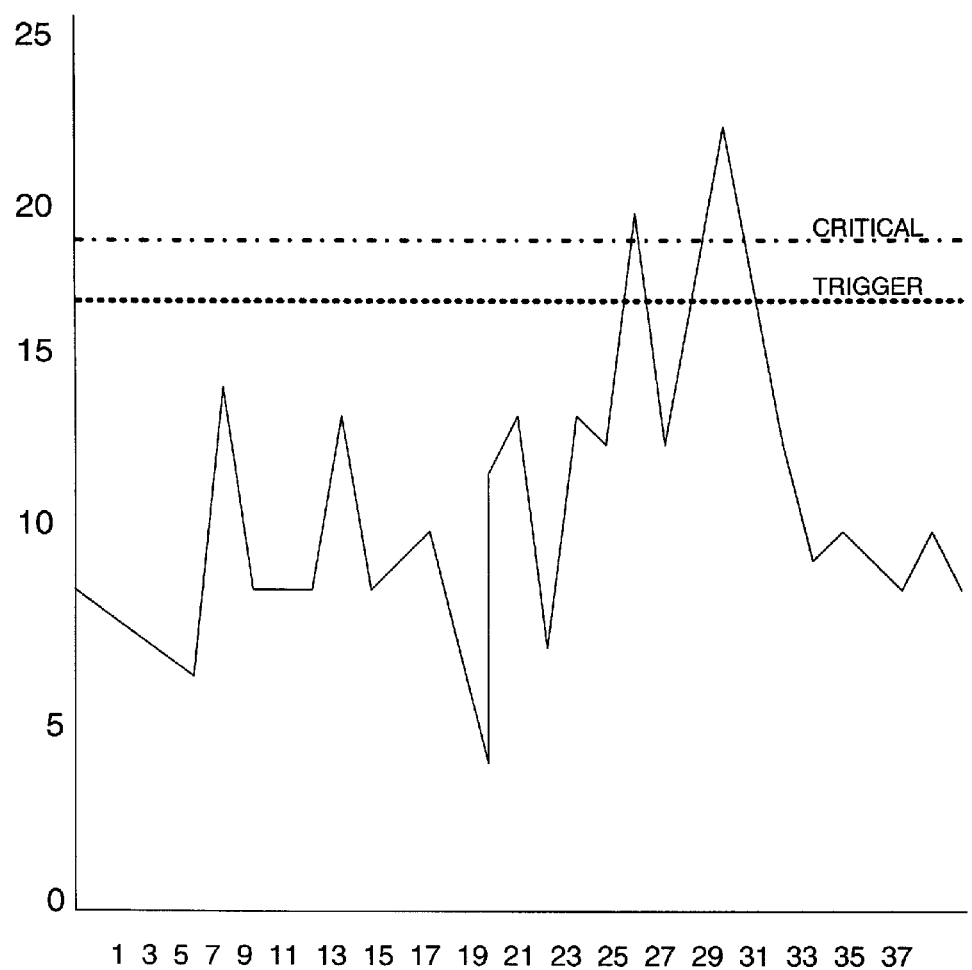
FIG. 3 shows, in line graph form, a single-trigger threshold setting below a critical setting according to one embodiment of the present invention.

FIG. 3 illustrates applying a Normal Distribution to random data. The lines shown on the chart are the levels critical point and debug trigger. In the example the system sets the debug trigger threshold to be at a higher probability than the user alert. Debug data gathering would be active at the points between the two lines. In the sample case, in all cases where debug triggering was active a user alert was driven shortly afterwards. Debug tracing was off for the majority of the time. This demonstrates that a probability distribution can be very effective at targeting when to apply debug tracing. It can be seen that the debug gather is always started shortly before the user alert is driven. In the example data the system is successful in predicting user alerts being driven and debug gathering is only activated shortly before user alert.

It will be clear to one of ordinary skill in the art that various other statistical methods (such as other probability distributions or a fraction of the standard deviation value) may be used with similarly advantageous results.

In a further improved embodiment, it is contemplated to have additional thresholds to provide a more finely-tuned control of the provision of diagnostic data.

Differing levels of detail of diagnostic data collection have a corresponding impact on system performance—the more detailed the diagnostics, the greater the impact to the system. By adjusting the level of trace to the severity of the problem this provides a more fine-grained control rather than simply being on or off.

Depending on the type of issue or the complexity of the software being investigated, different diagnostic levels/details would give the required information to diagnose the issue—knowing when to activate which level is a manual task. The greater the detail of trace, the greater is the likelihood of identifying a problem, but at the cost of greater system impact.

A preferred improved embodiment provides means for dynamically adjusting diagnostic levels based on pre-determined statistical values. Using statistical analysis of resource usage, it is possible to determine suitable thresholds at which different levels of diagnostic data need to be collected. Should the resource usage drop below the threshold, the level of diagnostic data is also lowered.

Instead of defining a single threshold for the diagnostic trigger as in the first embodiment described above, multiple thresholds may be defined. These thresholds may correspond to differing severities of problems: a low severity of problem would activate a lower detail of diagnostics while a more severe problem would enable greater levels of diagnostic detail. By providing a dynamic setting for the diagnostic level, adequate information will always be available for the level of "problem" experienced without resorting to an "all or nothing" approach.

The preferred embodiment works by having a resource (or resources) to be monitored and setting a suitable "critical" threshold for when to notify an operator that there is a problem.

By analysing a "typical" workload either manually or through statistical means, a "normal" range of resource usage can be defined. As the resource moves beyond that "normal" range towards the critical level, different diagnostic triggers can be set. The exact setting of these triggers depends on how granular the available diagnostic levels are and where the triggers are defined.

The worked example below shows a system where the triggers have been set using a statistical analysis of the workload:

A product defines 5 different diagnostic levels: 0-Error, 1-Warning, 2-Info, 3-Verbose, 4-Debug. Level 0 is always active during normal workload. The product uses sockets to communicate across a network and a problem occurs, for example, with a potential socket leak.

The resource socCount is set to be monitored. At a critical point, the system will run out of sockets, the critical level MAXSOC. Normal range of socket usage is socmin→socmax—the difference between MAXSOC and socmax is given as socAvail.

Somewhere between socmax and MAXSOC, triggers are set for the various diagnostic levels. Level 1 is activated at socmax+20% of socAvail; level 2 at socmax+40% of socAvail; level 3 at socmax+60% of socAvail; and level 4 at socmax+75% of socAvail. Should the number of sockets in use reach a particular threshold, that level of diagnostic information is gathered. If the number of sockets should fall, then the diagnostic level is reduced accordingly until back to normal levels.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

The invention claimed is:

1. An apparatus for monitoring a computer system operable for alerting an operator to failures associated with critical resource consumption and comprising:
   a processor; and
   storage coupled to said processor, wherein said storage stores software, and wherein said software runs on said processor to perform:
   monitoring resource consumption;
   setting a threshold of resource consumption for triggering diagnostic data collection between an average resource consumption value and a critical resource consumption value based on a probability based rule;
   in response to detecting a threshold crossing from a resource consumption value below said threshold to a resource consumption value above said threshold, starting diagnostic data collection; and
   in response to detecting a threshold crossing from a resource consumption value above said threshold to a resource consumption value below said threshold, stopping said diagnostic data collection.

2. The apparatus as claimed in claim 1, wherein said software runs on said processor to perform:
   storing diagnostic data.

3. The apparatus as claimed in claim 2, wherein said software runs on said processor to perform:
   purging said diagnostic data responsive to detecting said threshold crossing from said resource consumption value above said threshold to said resource consumption value below said threshold.

4. The apparatus as claimed in claim 1, wherein said software runs on said processor to perform:
   determining said threshold of resource consumption between said average resource consumption value and said critical resource consumption value using said probability-based rule, wherein said probability-based rule is one of a mean-and-deviation based rule, a Gaussian distribution based rule, and a Poisson distribution based rule.

5. The apparatus as claimed in claim 4, wherein said software runs on said processor to perform:
   accepting a plurality of inputs; and
   applying said probability-based rule to said plurality of inputs.

6. The apparatus as claimed in claim 1, wherein said software runs on said processor to perform:
   setting a plurality of thresholds each associated with a level of diagnostic data collection, and wherein diagnostic data collection for each said level is started and stopped based on said plurality of thresholds.

7. A method for monitoring a computer system operable for alerting an operator to failures associated with critical resource consumption and comprising:
   monitoring resource consumption;
   setting a threshold of resource consumption for triggering diagnostic data collection between an average resource consumption value and a critical resource consumption value based on a probability based rule;
   in response to detecting a threshold crossing from a resource consumption value below said threshold to a resource consumption value above said threshold, starting diagnostic data collection; and
   in response to detecting a threshold crossing from a resource consumption value above said threshold to a resource consumption value below said threshold, stopping said diagnostic data collection.

8. The method as claimed in claim 7, further comprising:
   storing diagnostic data.

9. The method as claimed in claim 8, further comprising:
   purging said diagnostic data responsive to detecting said threshold crossing from said resource consumption value above said threshold to said resource consumption value below said threshold.

10. The method as claimed in claim 7, further comprising:
    determining said threshold of resource consumption between said average resource consumption value and said critical resource consumption value using said probability-based rule, wherein said probability-based rule is one of a mean-and-deviation based rule, a Gaussian distribution based rule, and a Poisson distribution based rule.

11. The method as claimed in claim 10, further comprising:
accepting a plurality of inputs; and
applying said probability-based rule to said plurality of inputs.

12. The method as claimed in claim 7, further comprising:
setting a plurality of thresholds each associated with a level of diagnostic data collection, and wherein diagnostic data collection for each said level is started and stopped based on said plurality of thresholds.

13. A computer program product comprising computer program code stored on a computer readable medium, wherein said computer program code, when loaded into a computer system and executed thereon, causes said computer system to perform:
monitoring resource consumption;
setting a threshold of resource consumption for triggering diagnostic data collection between an average resource consumption value and a critical resource consumption value based on a probability based rule;
in response to detecting a threshold crossing from a resource consumption value below said threshold to a resource consumption value above said threshold, starting diagnostic data collection; and
in response to detecting a threshold crossing from a resource consumption value above said threshold to a resource consumption value below said threshold, stopping said diagnostic data collection.

14. The computer program product as claimed in claim 13, wherein said computer program code to, when loaded into said computer system and executed thereon, causes said computer system to perform:
storing diagnostic data.

15. The computer program product as claimed in claim 14, wherein said computer program code to, when loaded into said computer system and executed thereon, causes said computer system to perform:
purging said diagnostic data responsive to detecting said threshold crossing from said resource consumption value above said threshold to said resource consumption value below said threshold.

16. The computer program product as claimed in claim 13, wherein said computer program code to, when loaded into said computer system and executed thereon, causes said computer system to perform:
determining said threshold of resource consumption between said average resource consumption value and said critical resource consumption value using said probability-based rule, wherein said probability-based rule is one of a mean-and-deviation based rule, a Gaussian distribution based rule, and a Poisson distribution based rule.

17. The computer program product as claimed in claim 16, wherein said computer program code to, when loaded into said computer system and executed thereon, causes said computer system to perform:
accepting a plurality of inputs; and
applying said probability-based rule to said plurality of inputs.

18. The computer program product as claimed in claim 7, wherein said computer program code to, when loaded into said computer system and executed thereon, causes said computer system to perform:
setting a plurality of thresholds each associated with a level of diagnostic data collection, and wherein diagnostic data collection for each said level is started and stopped based on said plurality of thresholds.

* * * * *